US009884535B2

(12) United States Patent
Nakano et al.

(10) Patent No.: US 9,884,535 B2
(45) Date of Patent: Feb. 6, 2018

(54) VEHICLE

(71) Applicant: HONDA MOTOR CO., LTD., Tokyo (JP)

(72) Inventors: Kazuya Nakano, Wako (JP); Koichi Takahashi, Wako (JP); Sachiko Katsuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/298,233

(22) Filed: Oct. 20, 2016

(65) Prior Publication Data
US 2017/0106718 A1 Apr. 20, 2017

(30) Foreign Application Priority Data

Oct. 20, 2015 (JP) ................................. 2015-206583

(51) Int. Cl.
*B60K 11/00* (2006.01)
*B60H 1/00* (2006.01)
(Continued)

(52) U.S. Cl.
CPC ..... *B60H 1/00278* (2013.01); *B60H 1/00028* (2013.01); *B60H 1/00385* (2013.01); *B60K 1/04* (2013.01); *B60K 6/28* (2013.01); *B60H 2001/002* (2013.01); *B60H 2001/003* (2013.01); *B60H 2001/00085* (2013.01); *B60H 2001/00092* (2013.01); *B60K 2001/0416* (2013.01); *B60Y 2200/92* (2013.01); *B60Y 2306/05* (2013.01);
(Continued)

(58) Field of Classification Search
CPC ...... B60K 1/04; B60K 1/00; B60K 2001/003; B60K 2001/005; B60K 2001/0416; B60K 2001/0433; B60K 6/28; B60H 1/00278; B60H 1/00028; B60H 1/00385; B60H 1/00271; B60H 1/004; B60H 1/00392; B60H 2001/002; B60H 2001/003; B60H 2001/00092; B60H 2001/00085
See application file for complete search history.

(56) References Cited

U.S. PATENT DOCUMENTS 5,490,572 A * 2/1996 Tajiri ................. B60H 1/00278
180/65.1
7,048,321 B2 * 5/2006 Bandoh .................. B60N 2/468
180/68.5

(Continued)

FOREIGN PATENT DOCUMENTS

JP 2007-321738 12/2007
JP 2009-154696 7/2009

*Primary Examiner* — James M Dolak
(74) *Attorney, Agent, or Firm* — Mori & Ward, LLP

(57) ABSTRACT

A vehicle includes an air conditioning system, a high voltage equipment, a cooling fan, and an intake duct. The air conditioning system is to condition air in an interior of the vehicle which has a vehicle height direction. The cooling fan is to send cooling air which has passed through the air conditioning system to the high voltage equipment. The cooling fan has an intake port. The intake duct is connected to the intake port from upward in the vehicle height direction to supply the cooling air to the cooling fan. A lowermost part of the intake port in the vehicle height direction is positioned higher than a lowermost surface of a duct flow path of the intake duct in the vehicle height direction.

12 Claims, 8 Drawing Sheets

(51) Int. Cl.
    *B60K 1/04*         (2006.01)
    *B60K 6/28*         (2007.10)

(52) U.S. Cl.
    CPC ........ *Y10S 903/906* (2013.01); *Y10S 903/907* (2013.01)

(56) References Cited

U.S. PATENT DOCUMENTS

| | | | | |
|---|---|---|---|---|
| 7,642,002 | B2* | 1/2010 | Hamery | B60L 11/1874 180/68.1 |
| 7,810,596 | B2* | 10/2010 | Tsuchiya | B60K 1/04 180/68.1 |
| 7,900,727 | B2* | 3/2011 | Shinmura | B60K 1/04 180/68.1 |
| 8,527,095 | B2* | 9/2013 | Kikuchi | B60H 1/00278 165/121 |
| 8,684,118 | B2* | 4/2014 | Kosaka | B60H 1/00278 180/68.2 |
| 9,054,399 | B2* | 6/2015 | Mishima | B60K 1/04 |
| 9,067,486 | B2* | 6/2015 | Janarthanam | H01M 10/625 |
| 9,669,703 | B2* | 6/2017 | Kosaki | B60K 1/04 |
| 9,731,623 | B2* | 8/2017 | Rousseau | B60L 11/1874 |
| 9,758,009 | B2* | 9/2017 | Kardos | B60H 1/00278 |
| 9,758,012 | B2* | 9/2017 | Johnston | B60H 1/00278 |
| 9,780,422 | B2* | 10/2017 | Dunn | B60H 1/00278 |
| 9,786,964 | B2* | 10/2017 | Takeuchi | F25B 5/00 |
| 9,796,292 | B2* | 10/2017 | Jung | B60L 11/1874 |
| 2003/0226653 | A1* | 12/2003 | Takedomi | B60H 1/00278 165/43 |
| 2009/0071178 | A1* | 3/2009 | Major | B60H 1/00278 62/239 |

* cited by examiner

VEHICLE

CROSS-REFERENCE TO RELATED APPLICATIONS

The present application claims priority under 35 U.S.C. §119 to Japanese Patent Application No. 2015-206583, filed Oct. 20, 2015. The contents of this application are incorporated herein by reference in their entirety.

BACKGROUND OF THE INVENTION

Field of the Invention

The present invention relates to a vehicle.

Discussion of the Background

High voltage equipment including a battery (high voltage battery), a DC-DC converter, and an inverter is installed in vehicles such as an electric vehicle and a hybrid vehicle. This type of vehicle includes a cooling mechanism for maintaining the temperature of high voltage equipment within an appropriate range, to prevent degradation in performance of the high voltage equipment due to an abnormal temperature rise. For example, Japanese Patent Application Publication No. 2007-321738 and Japanese Patent Application Publication No. 2009-154696 disclose vehicles including a sirocco fan, as a cooling fan for supplying cooling air to high voltage equipment.

SUMMARY OF THE INVENTION

According to one aspect of the present invention, a vehicle includes an air conditioning system for air conditioning a vehicle inside, a high voltage equipment, and a cooling fan for sucking in air having passed through the air conditioning system and sending the air to the high voltage equipment, in which the vehicle includes an intake duct connected to an intake port of the cooling fan, and guiding the air having passed through the air conditioning system to the cooling fan, and the intake port opens upward, a lowermost position of the intake port positioned higher than a bottom surface of a duct flow path of the intake duct.

According to another aspect of the present invention, a vehicle includes an air conditioning system, a high voltage equipment, a cooling fan, and an intake duct. The air conditioning system is to condition air in an interior of the vehicle which has a vehicle height direction. The cooling fan is to send cooling air which has passed through the air conditioning system to the high voltage equipment. The cooling fan has an intake port. The intake duct is connected to the intake port from upward in the vehicle height direction to supply the cooling air to the cooling fan. A lowermost part of the intake port in the vehicle height direction is positioned higher than a lowermost surface of a duct flow path of the intake duct in the vehicle height direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
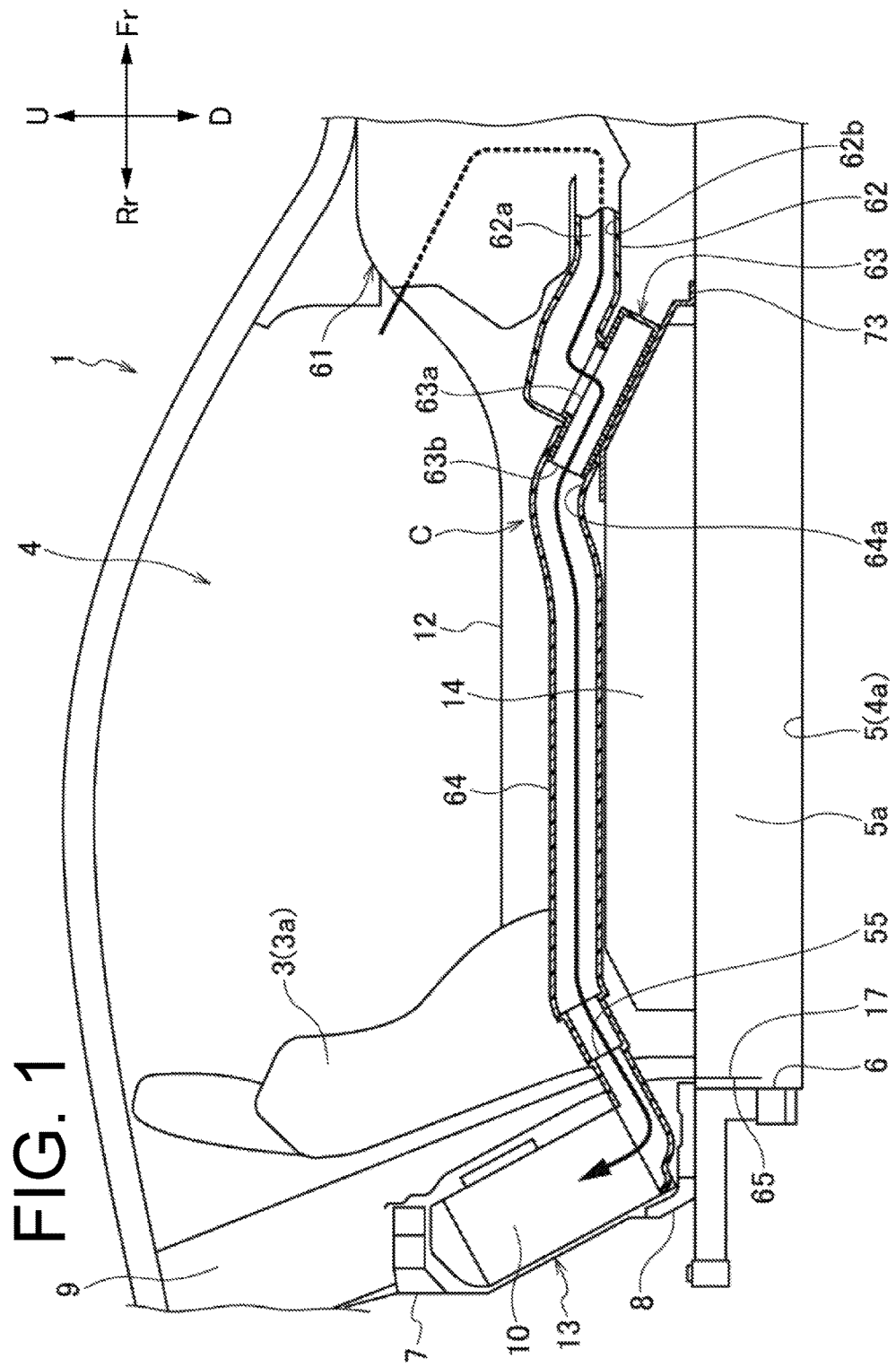
FIG. 1 is a schematic right side view of the interior of a vehicle according to an embodiment of the present invention.

The embodiments will now be described with reference to the accompanying drawings, wherein like reference numerals designate corresponding or identical elements throughout the various drawings.

Hereinafter, an embodiment of a vehicle of the present invention will be described with reference to the accompanying drawings. Note that the drawings are to be viewed in the direction of the reference numerals. In the following description, front and rear, right and left, and upper and lower directions are based on directions as viewed from the driver, and in the drawings, Fr indicates the front, Rr indicates the rear, L indicates the left, R indicates the right, U indicates the upper direction, and D indicates the lower direction of the vehicle.

Vehicle

Figure 2:
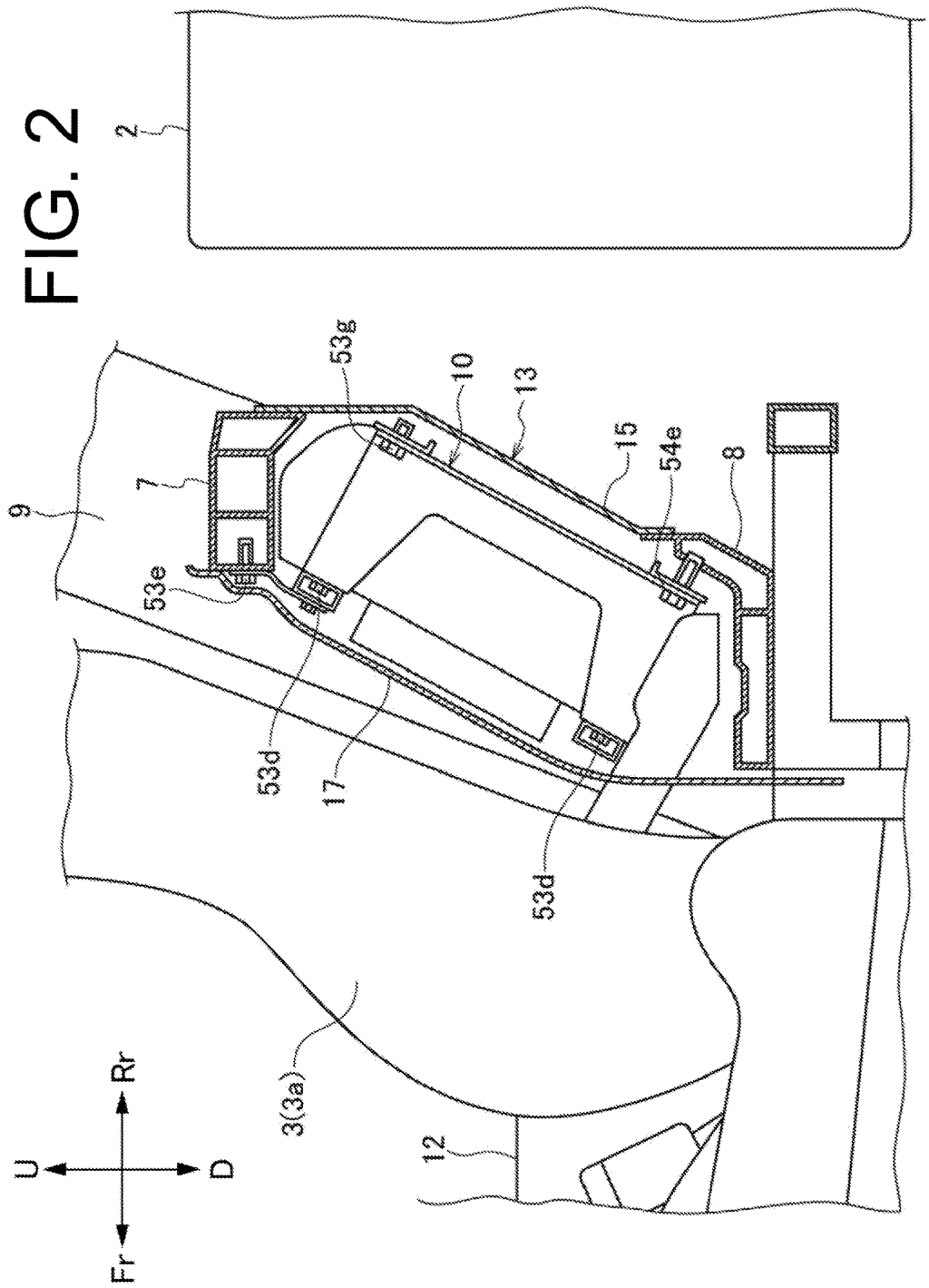
FIG. 2 is a left side view in which the rear of a seat is enlarged.

FIG. 1 is a schematic right side view of the interior of the vehicle according to an embodiment of the present invention, and FIG. 2 is a left side view in which the rear of a seat is enlarged.

As shown in FIGS. 1 and 2, a vehicle 1 of the embodiment is a hybrid sports vehicle in which an engine 2 is installed in a rear part of the vehicle body, and right and left seats 3 are arranged in front of the engine. In the vehicle, engine power drives right and left rear wheels (not shown), and two motors (not shown) drive right and left front wheels (not shown).

A floor panel 5 constituting a floor surface of a vehicle inside 4 includes a center tunnel 5a, which extends along the longitudinal direction at the center in the vehicle width direction. An upward rising kick-up portion 6 is formed in a rear end part of the floor panel 5. An inverter case 14 accommodating an inverter (not shown), which converts a DC voltage of a high voltage battery into a three-phase AC voltage and drives the motors, is provided above the center tunnel 5a. The seats 3 are arranged in front of the kick-up portion 6, on the right and left with the center tunnel 5a interposed therebetween, and a center console 12 covering an upper part of the center tunnel 5a is provided between the right and left seats 3.

An upper member 7 extending in the vehicle width direction is arranged in an upper part behind the seats 3, and a lower member 8 extending in the vehicle width direction on an upper part of the kick-up portion 6 is arranged in a lower part behind the seats 3. Also, a right and left pair of pillars 9 stand on both end parts in the vehicle width direction of the vehicle 1, behind the seats 3 in side view. A high voltage equipment-accommodation portion 13 is provided between the right and left pair of pillars 9.

[High Voltage Equipment-accommodation Portion]

Figure 3:
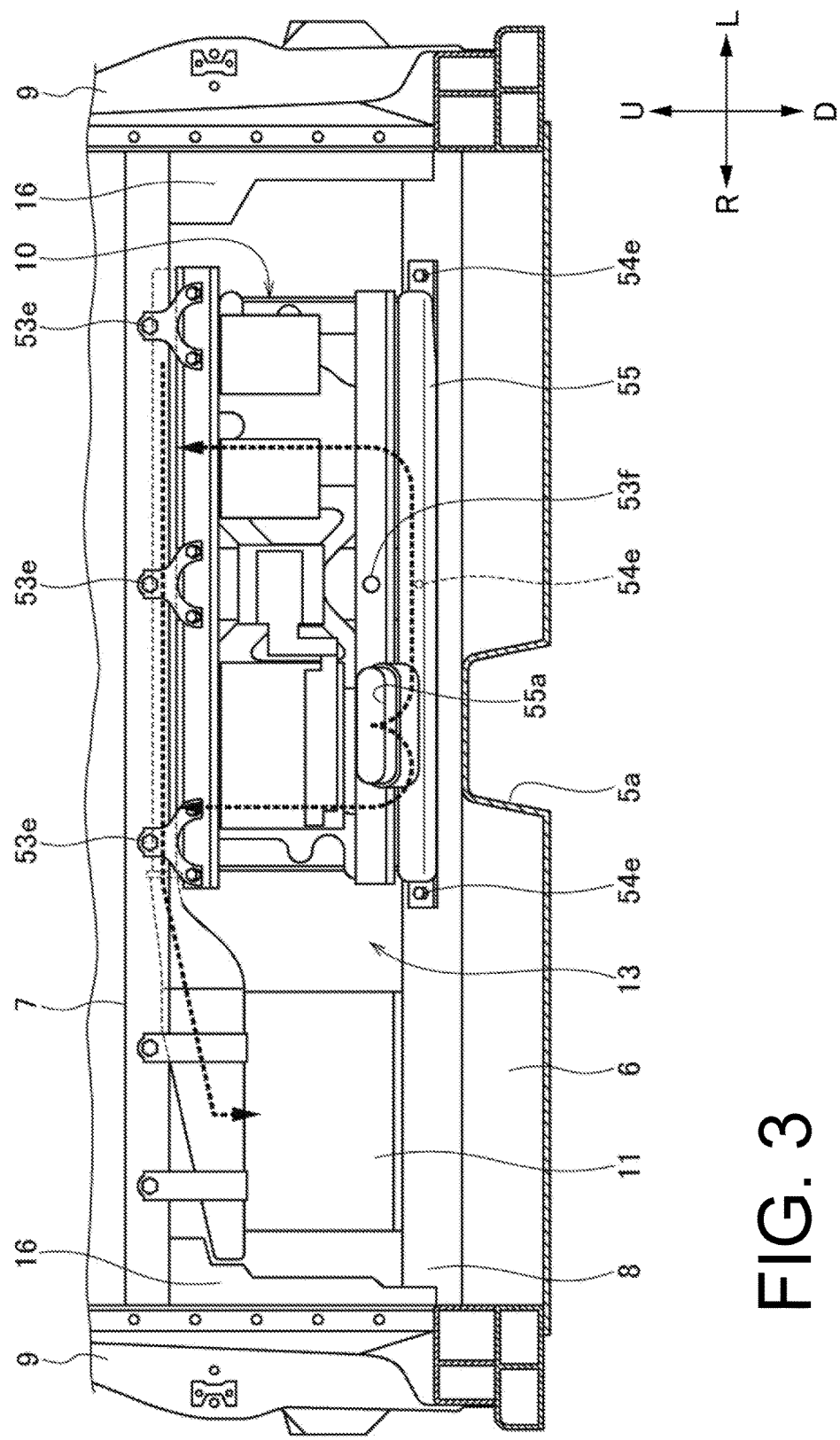
FIG. 3 is a front view of a high voltage equipment-accommodation portion in which a battery unit is arranged.
Figure 7:
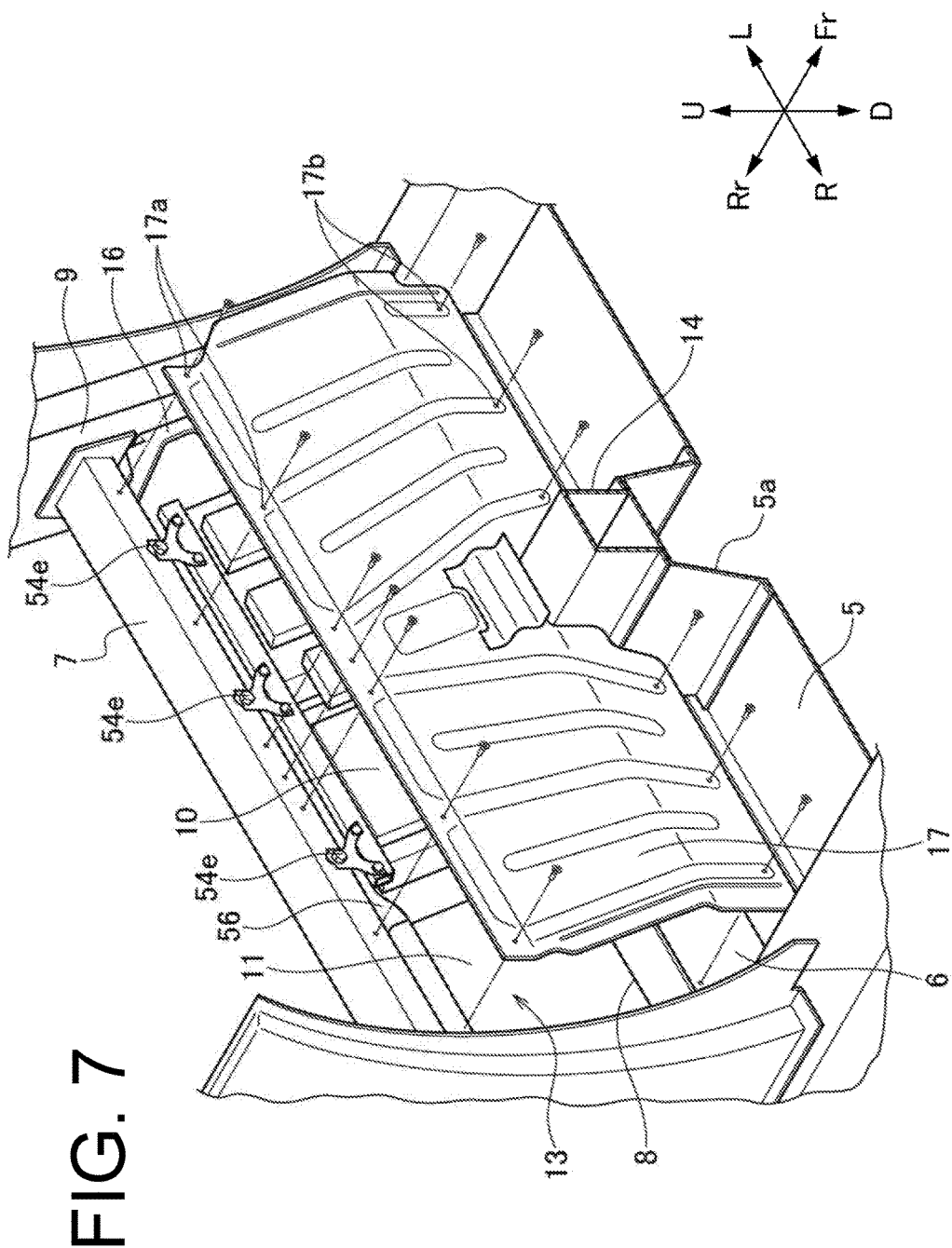
FIG. 7 is an exploded perspective view of a high voltage equipment-protection cover covering the front of the high voltage equipment-accommodation portion.

FIG. 3 is a front view of the high voltage equipment-accommodation portion 13, and FIG. 7 is an exploded perspective view of a high voltage equipment-protection cover 17 covering the front of the high voltage equipment-accommodation portion 13.

As shown in FIGS. 2 and 3, in the high voltage equipment-accommodation portion 13, the upper member 7 partitions an upper part, the lower member 8 partitions a lower part, the right and left pillars 9 partition right and left sides, and a rear cover 15, which is fastened to the upper member 7, lower member 8, and right and left pillars 9, partitions a rear part. The high voltage equipment-accommodation portion 13 accommodates a battery unit 10 and a DC-DC converter 11, which steps the high voltage battery down and supplies the voltage to low voltage equipment.

As shown in FIG. 7, the high voltage equipment-protection cover 17 covers the front of the high voltage equipment-accommodation portion 13, which accommodates the battery unit 10 and the DC-DC converter 11. The high voltage equipment-protection cover 17 includes multiple fastening points 17a, 17b in upper and lower end parts thereof. The high voltage equipment-protection cover 17 partitions the front part of the high voltage equipment-accommodation portion 13, when the fastening points 17a, 17b are fastened to the upper member 7 and the lower member 8. Note that details of the high voltage equipment-protection cover 17 will be described later.

High Voltage Equipment

The vehicle 1 is provided with the battery unit 10 consisting of a high voltage battery, as high voltage equipment. As mentioned above, the battery unit 10, together with the DC-DC converter 11 which is also high voltage equipment, is accommodated in the high voltage equipment-accommodation portion 13 provided behind the seats 3.

Figure 4:
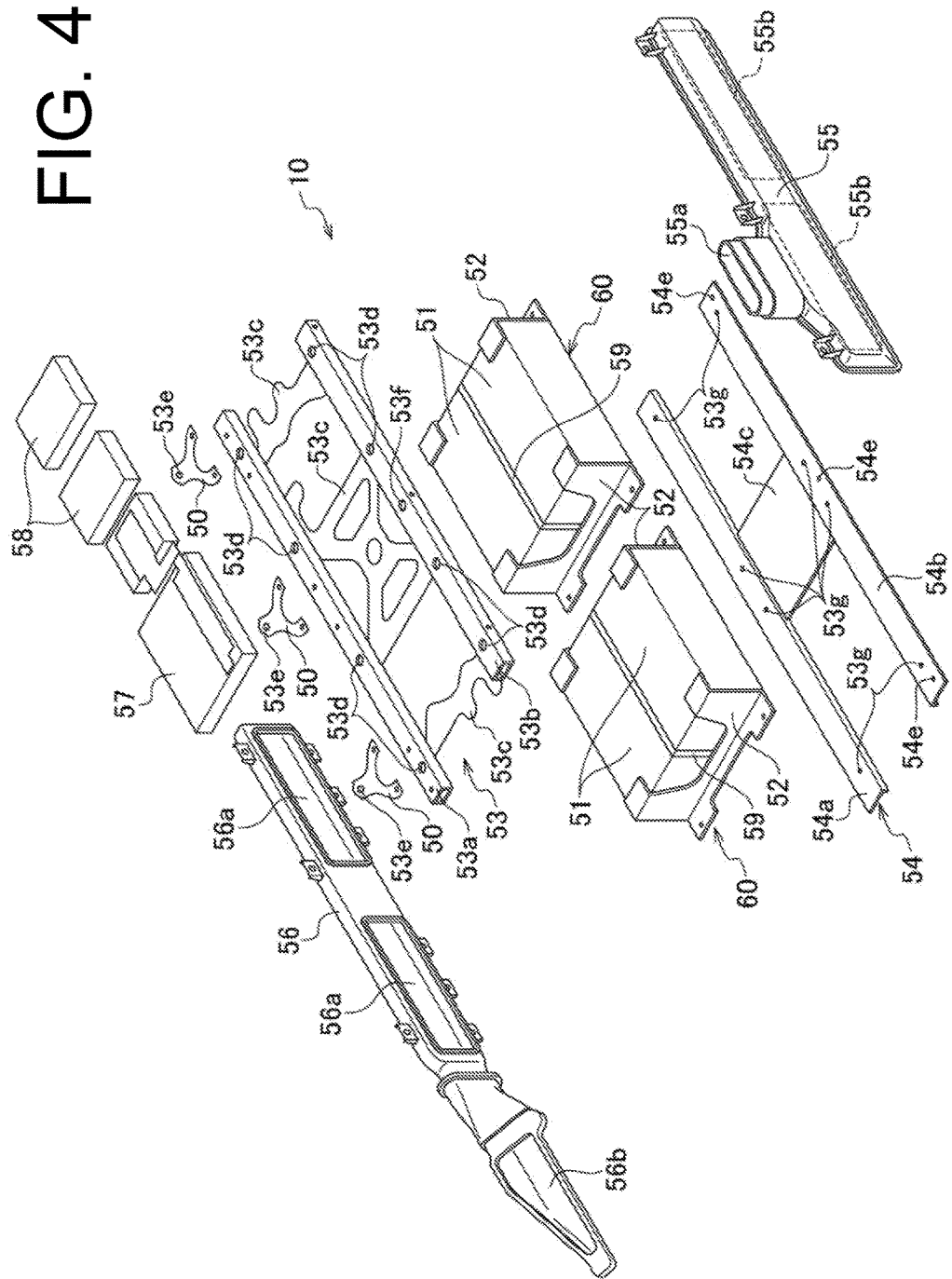
FIG. 4 is an exploded perspective view of the battery unit.
Figure 5:
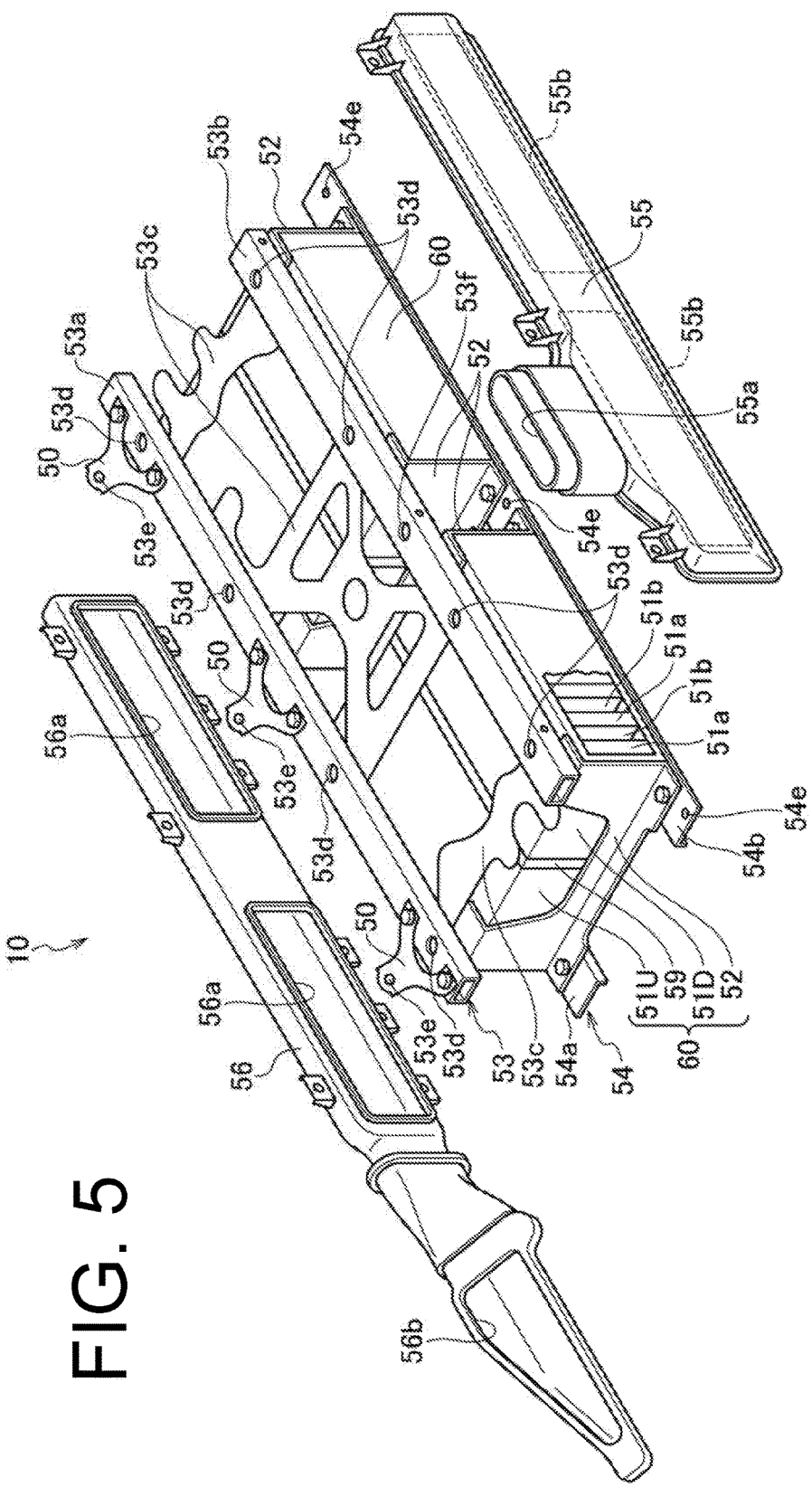
FIG. 5 is an exploded perspective view of the battery unit in which only ducts are disassembled.
Figure 6:
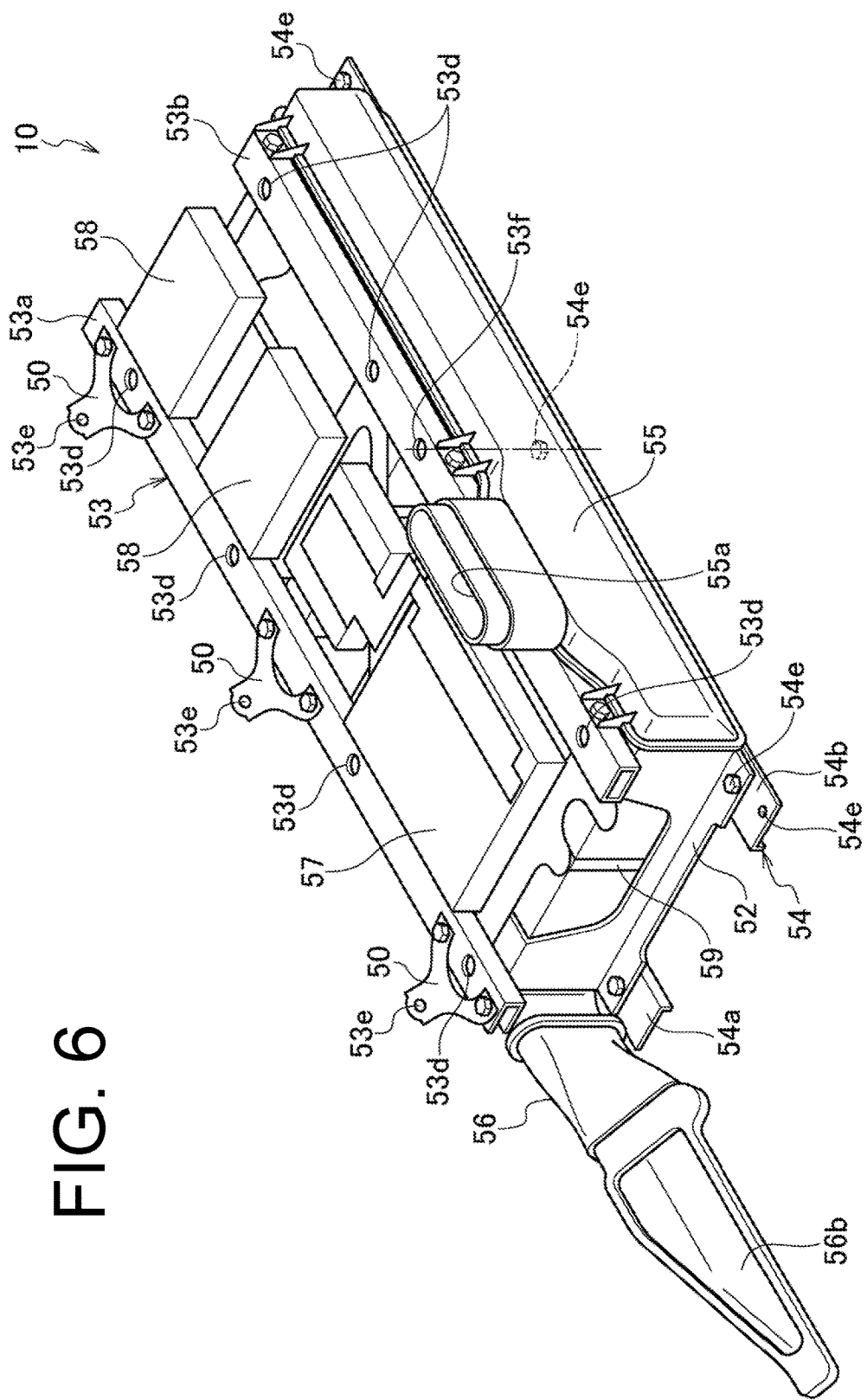
FIG. 6 is a perspective view of the battery unit.

FIG. 4 is an exploded perspective view of the battery unit 10, FIG. 5 is an exploded perspective view of the battery unit 10 in which only ducts are dissembled, and FIG. 6 is a perspective view of the battery unit 10.

As shown in FIGS. 4 to 6, the battery unit 10 includes: multiple battery modules 51; multiple battery brackets 52 supporting right and left side parts of the battery module 51; a front frame 53 provided along a front surface of the battery unit 10 and supporting the multiple battery modules 51 through the battery brackets 52; a rear frame 54 provided along a rear surface of the battery unit 10 and supporting the multiple battery modules 51 through the battery brackets 52; an inlet duct 55 provided along a lower surface of the battery unit 10, and introducing cooling air fed from outside the high voltage equipment-accommodation portion 13 into the battery modules 51; an exhaust duct 56 provided along an upper surface of the battery unit 10, and discharging cooling air having passed through the battery modules 51 to the DC-DC converter 11; a battery control unit 57 provided on the front frame 53, and controlling charging and discharging of the battery modules 51; and a pair of motor control units 58 provided on the front frame 53, and controlling driving of the motors.

The battery module 51 includes multiple batteries 51a arranged in parallel, with cooling air passages 51b interposed therebetween. The battery module 51 includes an upper battery module 51U and a lower battery module 51D stacked in the flow direction of cooling air, and an intermediate duct 59 that prevents leakage of cooling air is arranged between the upper battery module 51U and the lower battery module 51D. The vertically stacked upper battery module 51U and lower battery module 51D are connected by the battery brackets 52 provided on both right and left side surfaces thereof, and form a battery assembly 60. The battery unit 10 of the embodiment is configured of two battery assemblies 60 arranged side by side in the vehicle width direction.

The front frame 53 includes: an upper frame member 53a extending in the vehicle width direction in an upper part of the front surface of the battery unit 10; a lower frame member 53b extending in the vehicle width direction in a lower part of the front surface of the battery unit 10; and multiple connection members 53c connecting the upper frame member 53a and the lower frame member 53b. Multiple battery fastening points 53d fastened to the battery brackets 52 are provided in the upper frame member 53a and the lower frame member 53b. Additionally, three Y-formed brackets 50 each having an upper fastening point 53e fastened to the upper member 7 are attached to the upper frame member 53a, while a tool insertion hole 53f for inserting a tool when fastening the rear frame 54 to the lower member 8 is formed at the center in the vehicle width direction of the lower frame member 53b.

The rear frame 54 includes: an upper frame member 54a extending in the vehicle width direction in an upper part of the rear surface of the battery unit 10; a lower frame member 54b extending in the vehicle width direction in a lower part of the rear surface of the battery unit 10; and a connection member 54c connecting the upper frame member 54a and the lower frame member 54b. Multiple battery fastening points 53g fastened to the battery brackets 52 are provided in the upper frame member 54a and the lower frame member 54b. Three lower fastening points 54e fastened to the lower member 8 are provided in the lower frame member 54b.

The inlet duct 55 includes: an inlet port 55a for introducing cooling air fed from outside the high voltage equipment-accommodation portion 13 into the duct; and two battery connection ports 55b connected to the lower surface side of the lower battery modules 51D, and allowing cooling air inside the duct to flow into the passages 51b in the lower battery modules 51D.

The exhaust duct 56 includes; two battery connection ports 56a connected to the upper surface side of the upper battery modules 51U, and introducing cooling air having flowed out from the passages 51b in the upper battery modules 52U into the duct; and an exhaust port 56b for discharging cooling air inside the duct to the DC-DC converter 11.

When storing the battery unit 10 and the DC-DC converter 11 in the high voltage equipment-accommodation portion 13, first, a rear insulator (not shown) extending along a front surface of the rear cover 15, and right and left side insulators 16 extending along the inner side of the right and left pillars 9 are attached inside the high voltage equipment-accommodation portion 13. Then, while the battery unit 10 is positioned in a left offset position inside the high voltage equipment-accommodation portion 13, the upper fastening points 53e of the front frame 53 are fastened to the upper member 7 with bolts, and the lower fastening points 54e of the rear frame 54 are fastened to the lower member 8 with bolts. Note that when fastening the middle lower fastening point 54e of the rear frame 54 to the lower member 8 with a bolt, a tool is inserted into the tool insertion hole 53f formed at the center in the vehicle width direction of the lower frame member 53b, and the rear frame 54 is fastened to the lower member 8 with a bolt. Thus, the battery unit 10 is fixed inside the high voltage equipment-accommodation portion 13, while being tilted rearward along a back 3a of the seat 3 in side view. Thereafter, the DC-DC converter 11 is positioned in a right offset position inside the high voltage equipment-accommodation portion 13, and fastened to the upper member 7 and the lower member 8.

As mentioned above, the battery unit 10 accommodated in the high voltage equipment-accommodation portion 13 provided behind the seat 3 is tilted rearward along the back 3*a* of the seat 3 in side view, while its upper part is fastened to the upper member 7 through multiple upper fastening points 53*e*, and its lower part is fastened to the lower member 8 through multiple lower fastening points 54*e*. Accordingly, the upper member 7 and the lower member 8 support the battery unit 10 at both ends in the vertical direction.

Cooling Mechanism

Next, a cooling mechanism C for cooling the battery unit 10 and the DC-DC converter 11 will be described with reference to FIGS. 1 and 3.

As shown in FIGS. 1 and 3, the cooling mechanism C is configured of the aforementioned inlet duct 55, exhaust duct 56, and intermediate duct 59, and also an air conditioning system 61, an intake duct 62, a cooling fan 63, a supply duct 64, and an exhaust passage 65. While the air conditioning system 61 is arranged in front of the seats 3 to air condition the vehicle inside 4, the cooling mechanism C cools the battery unit 10 and the DC-DC converter 11 by use of air (cold air) having passed through the air conditioning system 61. The cooling fan 63 is arranged in front of the seats 3, and above the center tunnel 5*a*. An intake port 63*a* of the cooling fan 63 is connected to the air conditioning system 61 through the intake duct 62, and a discharge port 63*b* of the cooling fan 63 is connected to the aforementioned inlet port 55*a* of the inlet duct 55 through the supply duct 64.

When powered on, the cooling fan 63 sucks in cooling air having passed through the air conditioning system 61 through the intake duct 62, and sends the sucked in cooling air to the inlet duct 55 of the battery unit 10 through the supply duct 64. The inlet duct 55 introduces the cooling air from the cooling fan 63 into the high voltage equipment-accommodation portion 13, and allows the cooling air to flow into the passages 51*b* of the two battery assemblies 60 arranged side by side, from below. The cooling air having flowed into the passages 51*b* of the battery assemblies 60 is guided upward while cooling the battery modules 51, and flows into the exhaust duct 56. The cooling air having flowed into the exhaust duct 56 is guided to one side (right side in the embodiment) along the exhaust duct 56, and is discharged to the DC-DC converter 11 from above, through the exhaust port 56*b* of the exhaust duct 56. The cooling air having flowed into the DC-DC converter 11 is guided downward while passing the back of and cooling the DC-DC converter 11, and is diffused into the high voltage equipment-accommodation portion 13 from a lower part of the DC-DC converter 11. Then, the cooling air diffused inside the high voltage equipment-accommodation portion 13 is discharged into the vehicle inside 4, through the discharge passage 65 formed on the lower end side of the high voltage equipment-accommodation portion 13.

Next, the cooling fan 63, the intake duct 62, and the supply duct 64, which are main parts of the present invention, will be described with reference to FIGS. 1 to 8.

Figure 8:
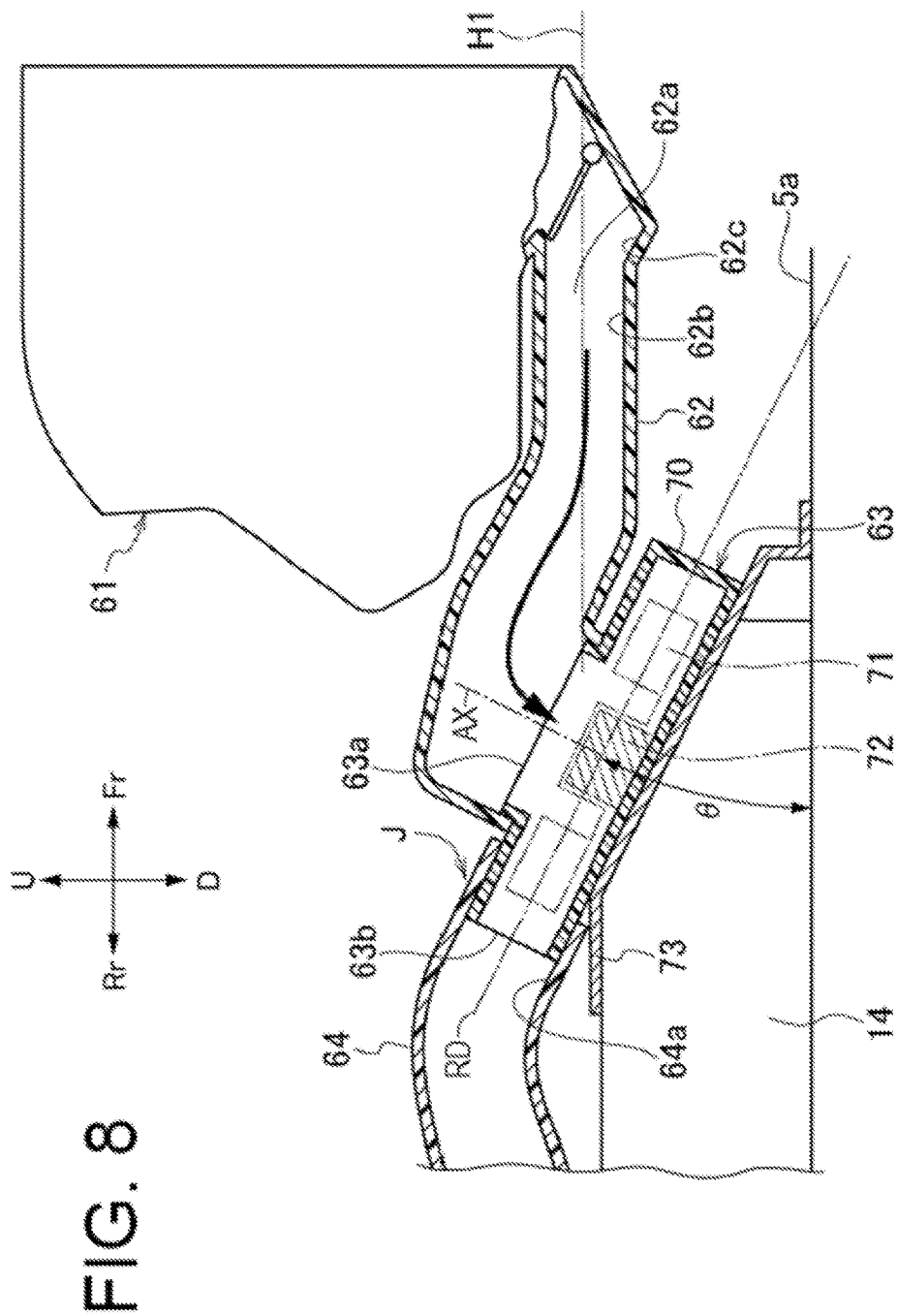
FIG. 8 is a cross-sectional view of an air conditioning system, an intake duct, and a cooling fan.

FIG. 8 is a cross-sectional view of the air conditioning system 61, the intake duct 62, and the cooling fan 63.

As shown in FIG. 8, the cooling fan 63 of the embodiment is a sirocco fan, and includes a fan case 70, a rotary fan 71 installed inside the fan case 70, and a motor 72 arranged in a center part of the rotary fan 71 to rotate the rotary fan 71. The rotary fan 71 has a rotation axis extending in an axial direction AX and is rotatable around the rotation axis. The intake port 63*a* is formed in an upper surface part of the fan case 70, in the direction of the rotation axis of the rotary fan 71, while the discharge port 63*b* protrudes from the fan case 70 along the direction of the tangent to the rotary fan 71. In other words, the intake port 63*a* opens in the axial direction AX, and the discharge port protrudes in a radial direction RD perpendicular to the axial direction AX.

The cooling fan 63 is attached above the center tunnel 5*a* at a downward inclination θ toward the front, such that the intake port 63*a* faces the front obliquely upper direction, and the discharge port 63*b* faces the rear obliquely upper direction. In the embodiment, the cooling fan 63 is attached through a fan bracket 73, which is bridged across a tip end-upper surface of the inverter case 14 and the center tunnel 5*a* at the inclination θ.

The intake duct 62 is arranged along the longitudinal direction, and its front end side is connected to the air conditioning system 61, while its rear end side is connected to the intake port 63*a* of the cooling fan 63. A duct flow path 62*a* is formed inside the intake duct 62. Air having passed through the air conditioning system 61 passes through the duct flow path 62*a* of the intake duct 62, and is guided to the intake port 63*a* of the cooling fan 63. A bottom surface 62*b* of the duct flow path 62*a* is lower than a lowermost position H1 of the intake port 63*a*. In other words, the lowermost position H1 of the intake port 63*a* of the cooling fan 63 is positioned higher than the bottom surface 62*b* of the duct flow path 62*a*. Reference numeral 62*c* indicates a trap portion provided in an upstream part of the duct flow path 62*a* to store water.

The supply duct 64 is arranged along the longitudinal direction, and its front end side is connected to the discharge port 63b of the cooling fan 63, while its rear end side is connected to the inlet port 55*a* of the inlet duct 55. The supply duct 64 is arranged substantially horizontally along an upper surface of the inverter case 14 inside the center console 12, but has an uprise portion 64*a*, which is inclined upward from a junction J with the discharge port 63*b* of the cooling fan 63 toward the downstream side of the supply duct.

As has been described, according to the vehicle 1 of the embodiment, the intake port 63*a* of the cooling fan 63 opens upward, and the lowermost position H1 of the intake port 63*a* is positioned higher than the bottom surface 62*b* of the duct flow path 62*a* of the intake duct 62. Hence, water generated by condensation or other causes on the upstream side of the cooling fan 63 can be held inside the intake duct 62, so that entry of water into the cooling fan 63 can be prevented.

Also, since the cooling fan 63 is arranged at the inclination θ such that the intake port 63*a* opens toward the obliquely upper direction, water generated by condensation in the vicinity of the intake port 63*a* can be discharged to the duct flow path 62*a*. Also, even if water enters the cooling fan 63, the water having entered can be kept from being discharged from the discharge port 63*b*, so that entry of water into the battery unit 10 can be prevented.

Also, cooling air is fed to the battery unit 10 arranged behind the seats 3 from the cooling fan 63 arranged in front of the seats 3, through the supply duct 64 arranged inside the center console 12. Hence, the passage of cooling air from the cooling fan 63 to the battery unit 10 can be elongated. As a result, even if water enters the cooling fan 63, the water is less likely to reach the battery unit 10.

Also, the supply duct 64 has the uprise portion 64*a*, which is inclined upward from the junction with the discharge port 63*b* of the cooling fan 63 toward the downstream side of the supply duct. Hence, even if water enters the cooling fan 63, the water can be prevented from entering the supply duct 64.

Also, the intake duct 62 connected to the intake port 63a of the cooling fan 63 and the supply duct 64 connected to the discharge port 63b of the cooling fan 63 extend in the longitudinal direction of the vehicle 1. Hence, the intake duct 62 and the supply duct 64 project less in the vehicle width direction.

Note that the present invention is not limited to the embodiment described above, and may be modified or improved, for example, as is appropriate.

For example, although the cooling fan 63 of the embodiment is arranged at the downward inclination θ toward the front, such that the intake port 63a faces the front obliquely upper direction and the discharge port 63b faces the rear obliquely upper direction, the invention is not limited to this. Instead, the cooling fan 63 may be arranged such that the intake port 63a faces the upper direction, and the discharge port 63b faces the rear direction (θ≈0). Also, the front and rear may be reversed.

Moreover, while the embodiment uses the battery unit and the DC-DC converter as an example of high voltage equipment to which the present invention is applied, the high voltage equipment to which the present invention is applied may be any one of a battery unit, a DC-DC converter, and an inverter, or a combination of two or more of these devices. Also, the battery does not necessarily have to be unitized.

According to an embodiment of the present invention, a vehicle (e.g. vehicle 1 of later-mentioned embodiment) includes:

an air conditioning system (e.g. air conditioning system 61 of later-mentioned embodiment) for air conditioning a vehicle inside (e.g. vehicle inside 4 of later-mentioned embodiment);

high voltage equipment (e.g. battery unit 10 and DC-DC converter 11 of later-mentioned embodiment); and a cooling fan (e.g. cooling fan 63 of later-mentioned embodiment) for sucking in air having passed through the air conditioning system and sending the air to the high voltage equipment, in which:

the vehicle includes an intake duct (e.g. intake duct 62 of later-mentioned embodiment) connected to an intake port (e.g. intake port 63a of later-mentioned embodiment) of the cooling fan, and guiding the air having passed through the air conditioning system to the cooling fan; and the intake port opens upward, a lowermost position (e.g. lowermost position H1 of later-mentioned embodiment) of the intake port positioned higher than a bottom surface (e.g. bottom surface 62b of later-mentioned embodiment) of a duct flow path (e.g. duct flow path 62a of later-mentioned embodiment) of the intake duct.

According to the embodiment of the present invention, the intake port of the cooling fan opens upward, and the lowermost position of the intake port is positioned higher than the bottom surface of the duct flow path of the intake duct. Hence, water generated by condensation or other causes on the upstream side of the cooling fan can be held inside the intake duct, so that entry of water into the cooling fan can be prevented.

Also, according to the embodiment of the present invention, the cooling fan is tilted such that the intake port opens toward an obliquely upper direction.

Since the cooling fan is tilted such that the intake port opens toward the obliquely upper direction, water generated by condensation in the vicinity of the intake port can be discharged to the duct flow path. Also, even if water enters the cooling fan, the water having entered can be kept from being discharged from the discharge port, so that entry of water into the high voltage equipment can be prevented.

Further, according to the embodiment of the present invention, the air conditioning system and the cooling fan are arranged in front of a seat (e.g. seat 3 of later-mentioned embodiment). The high voltage equipment may be arranged behind the seat. Air discharged from a discharge port (e.g. discharge port 63b of later-mentioned embodiment) of the cooling fan is fed to the high voltage equipment, through a supply duct (e.g. supply duct 64 of later-mentioned embodiment) arranged inside a center console (e.g. center console 12 of later-mentioned embodiment).

In this structure, cooling air is fed to the high voltage equipment arranged behind the seat from the cooling fan arranged in front of the seats, through the supply duct arranged inside the center console. Hence, the passage of cooling air from the cooling fan to the high voltage equipment can be elongated. As a result, even if water enters the cooling fan, the water is less likely to reach the high voltage equipment.

Further, according to the embodiment of the present invention, the cooling fan is configured to suck in air through the intake port formed in a direction of a rotation axis of an interior rotary fan (e.g. rotary fan 71 of later-mentioned embodiment), and to discharge the sucked in air through a discharge port (e.g. discharge port 63b of later-mentioned embodiment) protruding in a direction of a tangent to the rotary fan. The intake duct connected to the intake port and a supply duct connected to the discharge port extend in the longitudinal direction of the vehicle.

Since the intake duct connected to the intake port of the cooling fan and the supply duct connected to the discharge port of the cooling fan extend in the longitudinal direction of the vehicle, the intake duct and the supply duct project less in the vehicle width direction.

Further, according to the embodiment of the present invention, the supply duct has an uprise portion (e.g. uprise portion 64a of later-mentioned embodiment), which is inclined upward from a junction with the discharge port of the cooling fan toward the downstream side of the supply duct.

Since the supply duct has the uprise portion, which is inclined upward from the junction with the discharge port of the cooling fan toward the downstream side of the supply duct, even if water enters the cooling fan, the water can be prevented from entering the supply duct.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
an air conditioning system for air conditioning a vehicle inside;
at least one item of high voltage equipment; and
a cooling fan for sucking in air having passed through the air conditioning system and sending the air to the at least one item of high voltage equipment, wherein:
the vehicle includes an intake duct connected to an intake port of the cooling fan, and guiding the air having passed through the air conditioning system to the cooling fan; and
the intake port opens upward in relation to a vehicle height direction, a lowermost position of the intake port being positioned higher than a bottom surface of a duct flow path of the intake duct, the intake duct being entirely located upstream of the intake port of the cooling fan in an air flow direction.

2. The vehicle according to claim 1, wherein the cooling fan is tilted such that the intake port opens obliquely upward in the vehicle height direction.

3. The vehicle according to claim 1, wherein:
the air conditioning system and the cooling fan are arranged in front of a seat;
the at least one item of high voltage equipment is arranged behind the seat; and
air discharged from a discharge port of the cooling fan is fed to the at least one item of high voltage equipment, through a supply duct arranged inside a center console.

4. The vehicle according to claim 1, wherein:
the cooling fan is configured to suck in air through the intake port formed in a direction of a rotation axis of an interior rotary fan, and to discharge the sucked in air through a discharge port protruding in a direction of a tangent to the rotary fan; and
the intake duct is connected to the intake port and a supply duct is connected to the discharge port, the intake duct and the supply duct extend in the longitudinal direction of the vehicle.

5. The vehicle according to claim 3, wherein the supply duct has an uprise portion, which is inclined upward from a junction with a discharge port of the cooling fan toward a downstream side of the supply duct.

6. A vehicle comprising:
an air conditioning system to condition air in an interior of the vehicle which has a vehicle height direction;
at least one item of high voltage equipment;
a cooling fan to send cooling air which has passed through the air conditioning system to the at least one item of high voltage equipment, the cooling fan having an intake port; and
an intake duct connected to the intake port from upward in the vehicle height direction to supply the cooling air to the cooling fan, a lowermost part of the intake port in the vehicle height direction being positioned higher than a lowermost surface of a duct flow path of the intake duct in the vehicle height direction, the intake duct being entirely located upstream of the intake port of the cooling fan in an air flow direction.

7. The vehicle according to claim 6, wherein the cooling fan is tilted such that the intake port opens obliquely upward in the vehicle height direction.

8. The vehicle according to claim 6,
wherein:
the air conditioning system and the cooling fan are arranged in front of a seat in a vehicle longitudinal direction perpendicular to the vehicle height direction;
the at least one item of high voltage equipment is arranged behind the seat in the vehicle longitudinal direction; and
the cooling air discharged from a discharge port of the cooling fan is fed to the at least one item of high voltage equipment, through a supply duct arranged inside a center console of the vehicle.

9. The vehicle according to claim 6,
wherein the cooling fan includes an interior rotary fan having a rotation axis extending in an axial direction and rotatable around the rotation axis,
wherein the intake port opens in the axial direction,
wherein the cooling fan includes a discharge port through which the cooling air is discharged, the discharge port protruding in a radial direction perpendicular to the axial direction, and
wherein the intake duct is connected to the intake port and a supply duct is connected to the discharge port, the intake duct and the supply duct extend in a longitudinal direction perpendicular to the vehicle height direction.

10. The vehicle according to claim 8, wherein the supply duct has an uprise portion, which is inclined upward in the vehicle height direction from a junction with the discharge port of the cooling fan toward a downstream side of the supply duct.

11. The vehicle according to claim 1,
the intake duct is located immediately upstream of the intake port of the cooling fan in an air flow direction.

12. The vehicle according to claim 6,
the intake duct is located immediately upstream of the intake port of the cooling fan in an air flow direction.

* * * * *